United States Patent Office 3,126,315
Patented Mar. 24, 1964

3,126,315
ANTIFERTILITY COMPOSITION FOR INSECTS
Charles W. Woods, University Park, and Morton Beroza, Silver Spring, Md., assignors to the United States of America as represented by the Secretary of Agriculture
No Drawing. Filed July 3, 1962, Ser. No. 207,438
10 Claims. (Cl. 167—33)
(Granted under Title 35, U.S. Code (1952), sec. 266)

A nonexclusive, irrevocable, royalty-free license in the invention herein described throughout the world for all purposes of the United States Government, with the power to grant sub-licenses for such purposes, is hereby granted to the Government of the United States of America.

This application is a continuation-in-part of application Serial No. 103,176, filed April 14, 1961, now abandoned.

This invention relates to the use of certain synthetic organic compounds for the control or eradication of insect population by causing sexual sterility in the insect.

It has been proposed that the introduction of a sufficient number of sterile male or female insects into an insect population will cause a reduction in that population. Reared or wild insects that have been rendered incapable of reproduction but still capable of mating can be used. Sterile insects mating with fertile ones will result in the females laying only nonviable eggs, thus decreasing the reproductive capacity of the species.

The practicality of this approach to insect control was demonstrated in the eradication of the screw-worm on the island of Curacao and subsequently in Florida and southeastern States. In this case, sexual sterility in the reared screw-worm flies was produced by irradiation of the insect in its pupal stage with gamma rays. Sufficient quantities of sterile flies were reared and released so that the initial ratio of sterile flies to wild flies was estimated to be between 2 and 4 to 1. This procedure caused eradication of the fly in three months or in about three generations.

For best results, it would be most desirable to reduce the wild population to a low level. The usual persistent-type insecticide would not be suitable for this purpose since it would undoubtedly destroy the sterile insects in the same ratio as the wild ones. Sterilization of insects in nature by high-energy irradiation is not practical, probably not even possible, but this sterilization can be readily accomplished through the offering of a chemical at bait stations or by other means.

Therefore an object of this invention is to provide a material that can be used to achieve control of an insect population by sterilization of the wild insect.

Another object of this invention is to provide a material which will cause sexual sterility when fed or applied to reared insects. This will eliminate the need for dangerous and expensive ionizing radiation to induce sterility in insects.

In general, according to this invention certain N-substituted aziridinyl compounds have been found to cause sexual sterility when incorporated in the food or on contact with insects. These compounds were tested in the following manner.

Example 1

The standard or untreated diet of the adults of the Mexican fruit fly (*Anastrepha ludens*, Loew) was made up of a mixture of three parts of granulated sugar and one part of orange juice crystals and some protein hydrolysate as a supplement in a separate container. Ten grams of this food with or without the candidate antifertility agent in a 4-inch petri dish was provided on the day of adult emergence to each test cage of 40 to 80 pairs of flies. The dosage of chemical sterilant included in the food was applied as a 10 ml. solution in water, acetone, or an emulsion in xylol-water-acetone. Cages of treated flies were kept in a room maintained at 70–80° F. with relative humidity at 30–60 percent. Controls were kept in a separate room under identical conditions.

The flies were egged initially a few days after sexual maturity and twice thereafter at weekly intervals. Eggs were collected using oviposition shells placed in the cages for two hours late in the morning. Eggs were counted and then were incubated on blotting paper in closed petri dishes for four days. The emerging larvae were counted to determine hatch. The following typical results were obtained.

|  | Percent hatch at feeding level | |
|---|---|---|
|  | 0.1% | 1.0% |
| Tris[1-(2-methyl) aziridinyl]-phosphine oxide | 8.5 | no eggs |
| Tris[1-(2-methyl) aziridinyl]-phosphine sulfide | 2.0 | Do. |
| Phenyl bis[1-(2-methyl) aziridinyl]-phosphine oxide | 22.5 | 3.2 |

2,4,6-tris[-(2-methyl) aziridinyl]-s-triazine and 2,5-bis [1-(2-methyl) aziridinyl]-benzoquinone have also been tried and found to give positive results.

Example 2

This example describes test procedures used in the sterilization of the house fly whereby granulated sugar is treated with a 1% solution of the candidate chemosterilant. The sugar is allowed to dry, repulverized, and placed in emergence cages containing 100 newly emerged adult flies. Cages containing untreated food are used as checks. After 3 days a dish containing untreated fly food consisting of six parts of sugar, six parts of powdered nonfat dry milk, and one part of powdered egg, is added to the cages of flies. Five to seven days later ½ inch of wet NAIDM medium in a souffle cup is placed in the cage for oviposition. The same afternoon all egg masses are removed and placed in water to break up the egg masses into individual eggs. The eggs from all egg masses are mixed thoroughly and a random sample of 100 eggs is placed on a small piece of wet black cloth, which is placed on moist larval medium in a rearing container. After 3 days the eggs are examined and the percent hatch is determined. The larvae that hatch crawl from the cloth into the rearing medium, and 5 days after oviposition the number of pupae are counted to determine the number of larvae that reached the pupal stage of development.

[.25% active material]

| Chemical | Percent Match | Pupal Development |
|---|---|---|
| Tris[1-aziridinyl]-phosphine oxide | 0 | 0 |
| Tris[1-(2-methyl) aziridinyl]-phosphine oxide | 0 | 0 |
| Tris[1-(2-methyl) aziridinyl]-phosphine sulfide | 0 | 0 |

Example 3

The efficacy of the antifertility agents for sterilizing adult mosquitoes (*Aedes aegypti*) as described below. From 50 to 100 adults were kept in each cage where they were fed continuously on a 20% solution of honey in water containing a given percentage of the sterilant. No other food was available. A cotton pad saturated with water was placed on the top of the cage to supply moisture. Four days after emergence the mosquitoes were given a blood meal and eggs were deposited on wet filter paper provided in small beakers. The mosquitoes were then given a second blood meal and a second collection of eggs was made. The eggs were allowed to stand on wet filter paper for four days after which they were counted. The eggs were then flooded and the percent hatch was determined.

*Number of Eggs and Percent Hatch at Indicated Concentration*

EGGS FROM FIRST BLOOD MEAL

|  | 1% No. eggs | Percent Hatch | .5% No. eggs | Percent Hatch |
|---|---|---|---|---|
| Tris[1-(2-methyl) aziridinyl]-phosphine oxide | 7 | 0 | 0 | 0 |
| Tris[1-(2-methyl) aziridinyl]-phosphine sulfide | 0 | 0 | 0 | 0 |

EGGS FROM SECOND BLOOD MEAL

|  | No. eggs | Percent Hatch | No. eggs | Percent Hatch |
|---|---|---|---|---|
| Tris[1-(2-methyl) aziridinyl]-phosphine oxide | 31 | 0 | 0 | 0 |
| Tris[1-(2-methyl) aziridinyl]-phosphine sulfide | 0 | 0 | | |

The foregoing examples in which the reproductive capacity of the insects was depressed or eliminated by feeding a chemical are illustrative rather than limiting. For example, in regard to mode of administration other routes of administration of the chemical well known in the art of insect control, such as spraying, dipping, injection, may be employed as convenient to the particular situation and insect. The disclosure is also not meant to limit the action of the chemical sterilants to one particular stage of the insect growth cycle. It is known that in the pupal stage, for example, the insect is especially susceptible to the sterilizing action of the chemical.

We claim:
1. A method of causing sexual sterility in insects which comprises administering to the insect an N-substituted aziridinyl compound selected from the group consisting of tris[1-(2-methyl)aziridinyl]phosphine oxide, tris[1-(2-methyl)aziridinyl]phosphine sulfide, 2,4,6-tris[1-(2-methyl)aziridinyl]-s-triazine, phenyl bis[1-(2-methyl)aziridinyl]phosphine oxide, 2,5-bis[1-(2-methyl)aziridinyl]benzoquinone, tris[1-aziridinyl]phosphine oxide, and tris[1-(2,2-dimethyl)aziridinyl]-phosphine oxide.
2. The method of claim 1 where the aziridinyl compound is tris[1-(2-methyl) aziridinyl]-phosphine oxide.
3. The method of claim 1 where the aziridinyl compound is tris[1-(2-methyl) aziridinyl]-phosphine sulfide.
4. The method of claim 1 where the aziridinyl compound is 2,4,6-tris[1-(2-methyl) aziridinyl]-s-triazine.
5. The method of claim 1 where the aziridinyl compound is phenyl bis[1-(2-methyl) aziridinyl]-phosphine oxide.
6. The method of claim 1 where the aziridinyl compound is 2,5-bis[1-(2-methyl) aziridinyl]-benzoquinone.
7. The method of claim 1 where the aziridinyl compound is tris[1-aziridinyl]-phosphine oxide.
8. The method of claim 1 where the aziridinyl compound is tris[1-(2,2-dimethyl) aziridinyl]-phosphine oxide.
9. The method of claim 1 wherein the insect is the house fly.
10. The method of claim 1 wherein the insect is the Mexican fruit fly.

References Cited in the file of this patent

Annals of New York Academy of Sciences, vol. 68, Art. 3, pages 731–749.

Fahmy et al.: Nature, vol. 177, May 26, 1956, page 966.

Journal of National Cancer Institute, August 1957, pages 286 and 287.

Le Brecque, Journal of Economic Entomology, vol. 54, No. 4 (August 1961), pages 684–689.